(12) United States Patent
Plant et al.

(10) Patent No.: US 6,793,282 B2
(45) Date of Patent: Sep. 21, 2004

(54) CONVERTIBLE PASSENGER SEAT ASSEMBLY

(75) Inventors: Tommy G. Plant, Winston-Salem, NC (US); Randy Penley, Pfafftown, NC (US); Trevor B. Skelly, Winston-Salem, NC (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/238,404

(22) Filed: Sep. 10, 2002

(65) Prior Publication Data

US 2004/0046430 A1 Mar. 11, 2004

(51) Int. Cl.⁷ .............................................. A47C 15/00
(52) U.S. Cl. ...................... 297/248; 297/115; 297/232
(58) Field of Search ................................ 297/248, 116, 297/148, 146, 125, 126, 188.04, 238, 117, 127, 411.32

(56) References Cited

U.S. PATENT DOCUMENTS

| | | | | |
|---|---|---|---|---|
| 4,533,175 A | * | 8/1985 | Brennan | 297/232 |
| 4,536,027 A | * | 8/1985 | Brennan | 297/124 |
| 4,881,702 A | * | 11/1989 | Slettebak | 244/118.6 |
| 5,193,765 A | * | 3/1993 | Simpson et al. | 244/118.6 |
| 5,284,379 A | * | 2/1994 | Arnold et al. | 297/113 |
| 5,303,976 A | * | 4/1994 | Nobile et al. | 297/146 |
| 5,727,845 A | | 3/1998 | Jackson-Wynch | |
| 5,775,642 A | | 7/1998 | Beroth | |
| 5,788,324 A | * | 8/1998 | Shea et al. | 297/113 |

FOREIGN PATENT DOCUMENTS

| | | |
|---|---|---|
| GB | 2 280 363 | 2/1995 |
| GB | 2 234 146 | 5/1995 |
| GB | 2 288 973 | 5/1998 |

* cited by examiner

Primary Examiner—Peter M. Cuomo
Assistant Examiner—Erika Garrett
(74) Attorney, Agent, or Firm—Adams Evans P.A.

(57) ABSTRACT

A passenger seat assembly convertible between a two-seat configuration and a three-seat configuration, and including a seat assembly base and first, second and third seats for carrying respective seat bottom and seat back cushions, the first and third seats defining outboard seats and the second seat defining a center seat. First and second armrests are mounted between the first and third outboard seats on opposing sides of the center seat and are moveable between an upright use position and a retracted storage position above the seat bottom of the center seat. A tray table is mounted for movement between a raised retracted position wherein a bottom surface of the tray table defines at least a portion of the seat back of the center seat, and a lowered use position wherein the tray table resides above the seat bottom of the center seat to provide additional seating space and a tray table for the occupants of the outboard seats.

8 Claims, 6 Drawing Sheets

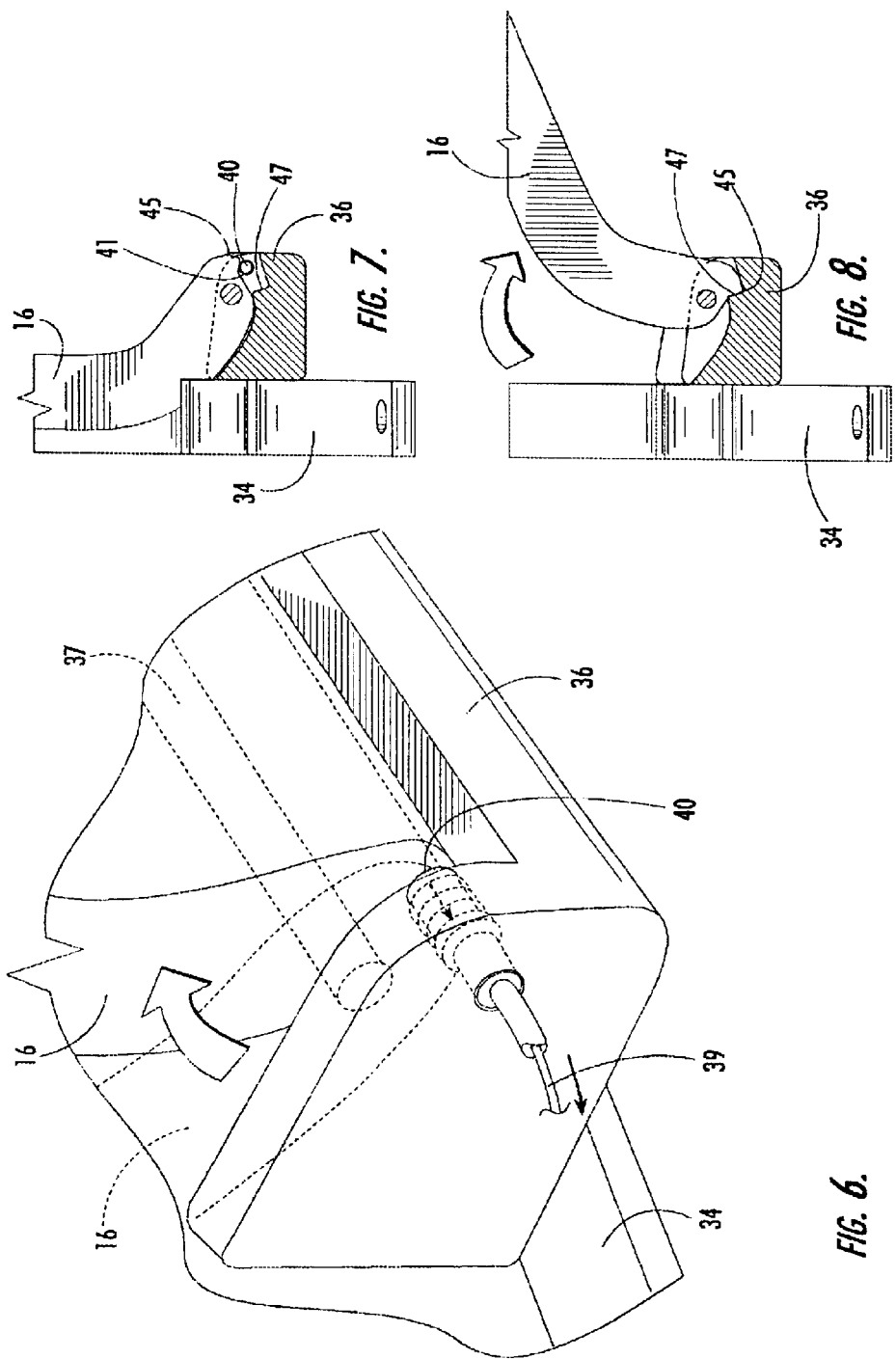

CONVERTIBLE PASSENGER SEAT ASSEMBLY

TECHNICAL FIELD AND BACKGROUND OF THE INVENTION

This invention relates to a passenger seat assembly, such as for use in a commercial aircraft, which is convertible between a three seat and a two seat configuration. This type of convertability permits airlines to quickly change the seat configuration to more closely match passenger mix and schedule changes. Changes in the airline industry have made quick turnaround time between flights of increasing importance. Because of financial losses, many airlines have cancelled or delayed new aircraft orders. Existing aircraft must be more quickly turned around between flights. In situations where seat configuration changes are needed, the ability to convert a seat between coach or economy class and business class configurations saves substantial time over replacement of an entire seat assembly, which generally requires the aircraft to be out of service at least overnight, and to be serviced by ground staff personnel.

Conventional aircraft seat assemblies are generally formed of two or more seats attached to a unifying frame which is in turn locked into a seating track in the floor of the aircraft. These seats are usually fixed onto the frame in such as way as to prevent adjustments to the width of the seat itself or to the spacing between adjacent seats on the assembly.

U.S. Pat. Nos. 5,178,345; 5,131,607; 5,104,065 and 4,881,702, all owned by the Boeing Company, disclose convertible seats, some of which alter the configuration of two-seat assemblies and three-seat assemblies, and others of which convert seat assemblies between two and three seats. Applicant's U.S. Pat. No. 5,597,139 also discloses a prior art manner of converting a three seat passenger seat set to a two seat passenger seat set suitable for use in a business class area of a passenger aircraft.

The convertible seat assembly disclosed in this application permits quick and simple conversion between two and three seats in a passenger seat by flight personnel between flights. More generally, the convertible seat assembly disclosed in this application permits quick and simple conversion between a seat set having any number of seats, wherein at least some of the inboard seats are converted to a buffer between adjacent seats, and accommodate a tray table for use by the occupants of the seats adjacent the buffer. The seat assembly is designed so that the transition features and the mechanisms for effecting the conversion are transparent to the occupant and positioned for access only by aircraft ground crews.

SUMMARY OF THE INVENTION

Therefore, it is an object of the invention to provide a passenger seat convertible between two and three seats.

It is another object of the invention to provide a passenger seat which permits quick conversion of economy seats to business-class seats.

It is another object of the invention to provide a passenger seat which is convertible between coach and business class seats.

It is another object of the invention to provide a passenger seat assembly which permits the center seat to be converted to a tray table.

These and other objects of the present invention are achieved in the preferred embodiments disclosed below by providing a passenger seat assembly convertible between a two-seat configuration and a three-seat configuration, comprising a seat assembly base and first, second and third seats for carrying respective seat bottom and seat back cushions, the first and third seats defining outboard seats and the second seat defining a center seat. First and second armrests are mounted between the first and third outboard seats on opposing sides of the center seat and are moveable between an upright use position and a retracted storage position above the seat bottom of the center seat. A tray table is mounted for movement between a raised retracted position wherein a bottom surface of the tray table defines at least a portion of the seat back of the center seat, and a lowered use position wherein the tray table resides above the seat bottom of the center seat to provide additional seating space and a tray table for the occupants of the outboard seats.

According to one preferred embodiment of the invention, the seat back of the center seat includes a headrest moveable between a headrest use position in lateral alignment with headrest portions of the backrests of the outboard seats and a lowered tray table use position aft of the tray table.

According to another preferred embodiment of the invention, the seat back of the center seat includes a headrest pivotable between a raised headrest use position in lateral alignment with headrest portions of the backrests of the outboard seats and a lowered tray table use position aft of the tray table.

According to yet another preferred embodiment of the invention, the tray table is pivotally mounted for movement between the raised retracted position and the lowered use position.

According to yet another preferred embodiment of the invention, the tray table comprises a single tray table surface sufficiently wide to be useable by occupants of both outboard seats as an inboard arm support and as a table for personal, food and beverage items.

According to yet another preferred embodiment of the invention, a passenger seat assembly is provided and is convertible between a two-seat configuration and a three-seat configuration, and comprises a seat assembly base, first, second and third seats for carrying respective seat bottom and seat back cushions, the first and third seats defining outboard seats and the second seat defining a center seat. First and second armrests are pivotably mounted between the first and third outboard seats on opposing sides of the center seat and are moveable between an upright use position and a retracted storage position above the seat bottom of the center seat. A tray table is mounted for movement between a raised retracted position wherein a bottom surface of the tray table defines a lower portion of the seat back of the center seat, and a lowered use position between the first and third outboard seats. The seat back of the center seat includes a headrest pivotable between a headrest use position in lateral alignment with headrest portions of the backrests of the outboard seats and a lowered tray table use position aft of the tray table.

According to yet another preferred embodiment of the invention, a passenger seat assembly is provided and is convertible between a coach class configuration with an armrest between each of a plurality of inboard seats, and a business class configuration. The seat assembly comprises a seat assembly base and at least first, second and third seats for carrying respective seat bottom and seat back cushions. Two of the seats define outboard seats and each remaining seat defines a respective inboard seat. Armrests are mounted on respective inboard sides of the outboard seats and on respective opposing sides of each inboard seat and are moveable between an upright use position and a retracted storage position above the seat bottom of the inboard seat to which a respective armrest is adjacent. A tray table is carried by at least one inboard seat and is mounted for movement between a retracted position wherein a bottom surface of the tray table defines at least a portion of the seat back of a respective inboard seat, and a use position between adjacent inboard or outboard seats.

An embodiment of the method of converting a passenger seat assembly between a two-seat configuration and a three-seat configuration according to the invention comprises the steps of providing a seat assembly base and first, second and third seats for carrying respective seat bottom and seat back cushions. The first and third seats define outboard seats and the second seat defines a center seat. First and second armrests are mounted between the first and third outboard seats on opposing sides of the center seat and are moveable between an upright use position and a retracted storage position above the seat bottom of the center. A tray table is mounted for movement between a raised retracted position wherein a bottom surface of the tray table defines at least a portion of the seat back of the center seat, and a lowered use position wherein the tray table resides above the seat bottom of the center seat to provide additional seating space and a tray table for the occupants of the outboard seats. When the seat assembly is desired to be in the three seat configuration, the armrests are moved to the upright use position and the tray table is raised into the position defining at least a portion of the seat back of the center seat. When the seat assembly is desired to be in the two seat configuration, the armrests are moved to the retracted storage position and the tray table is lowered into the use position above the seat bottom of the center seat.

According to yet another preferred embodiment of the invention, the method includes the step of pivoting a head rest portion of the center seat downwardly into a position aft of the tray table when the tray table is in its use position.

According to yet another preferred embodiment of the invention, a method of converting a passenger seat assembly convertible between a coach class configuration with an armrest between each of a plurality of inboard seats, and a business class configuration comprises the steps of providing a seat assembly base and at least first, second and third seats for carrying respective seat bottom and seat back cushions. Two of the seats define outboard seats and each remaining seat define a respective inboard seat. Armrests are mounted on respective inboard sides of the outboard seats and on respective opposing sides of each inboard seat and are moveable between an upright use position and a retracted storage position above the seat bottom of the inboard seat to which a respective armrest is adjacent. A tray table is carried by at least one inboard seat and mounted for movement between a retracted position wherein a bottom surface of the tray table defines at least a portion of the seat back of a respective inboard seat, and a use position between adjacent inboard or outboard seats. When the seat assembly is desired to be in the coach class configuration the armrests are moved to the upright use position and the tray table is raised into the position defining at least a portion of the seat back of the center seat. When the seat assembly is desired to be in the business class configuration, the armrests are moved to the retracted storage position and the tray table is lowered into the use position above the seat bottom of the center seat.

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 6 is a fragmentary perspective view showing the armrest being lowered;

FIG. 7 is a fragmentary side elevation of the latching mechanism showing the armrest in the raised use position; and FIG. 8 is a fragmentary side elevation of the latching mechanism showing the armrest in the lowered storage position.

DESCRIPTION OF THE PREFERRED EMBODIMENT AND BEST MODE

Figure 1:
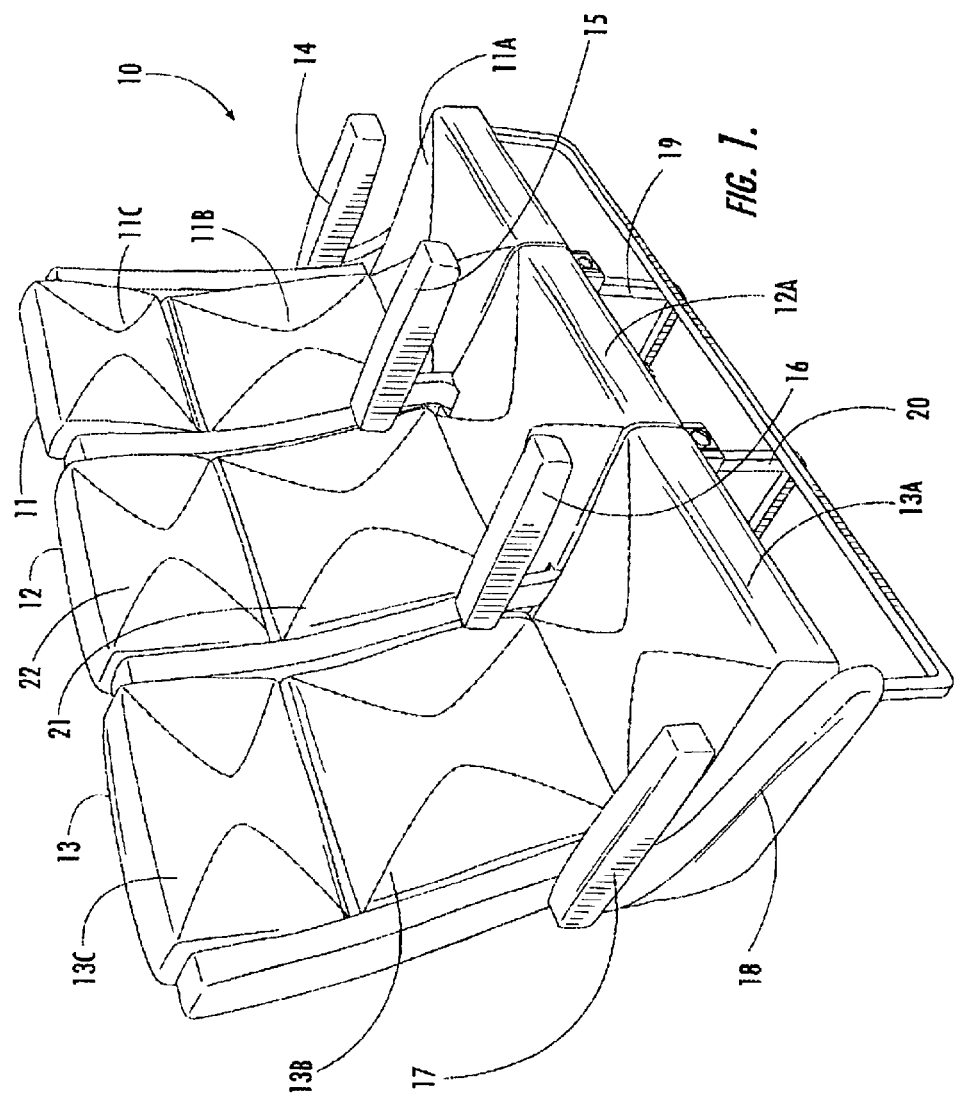
FIG. 1 is a perspective view of a passenger seat assembly in a three-seat economy configuration in accordance with an embodiment of the invention.

Referring now specifically to the drawings, a passenger seat assembly according to the present invention is illustrated in FIG. 1 and shown generally at reference numeral 10. The seat assembly 10 includes an outboard window seat 11, center seat 12 and an outboard aisle seat 13. In the economy configuration shown in FIG. 1, seat assembly 10 includes four armrests 14, 15, 16 and 17. Armrest 14 is positioned next to the window and armrest 17 with its full panel end bay 18 is positioned next to the aisle. Armrests 15 and 16 are shared by the three occupants.

The three seats 11, 12 and 13, and supporting frames, are mounted on legs 19 and 20 which are in turn locked into tracks (not shown) in the floor of the aircraft. When used in the center of an aircraft with aisles on both ends, both ends would have end bays such as end bay 18 in FIG. 1. Since the seat assembly 10 is otherwise identical, the seat assembly, whether used on the side or in the center of the aircraft will be referred to as "seat assembly 10".

Seat 11 includes a seat bottom cushion 11A, a seat back cushion 11B, and a head rest cushion 11C. Seat 13 includes a seat bottom cushion 13A, a seat back cushion 13B and a head rest cushion 13C. The center seat 12 includes a seat bottom cushion 12A, a seat back cushion 21 and a head rest cushion 22. The seat assembly 10 is designed to be in all respects conventional in overall appearance.

Figure 2:
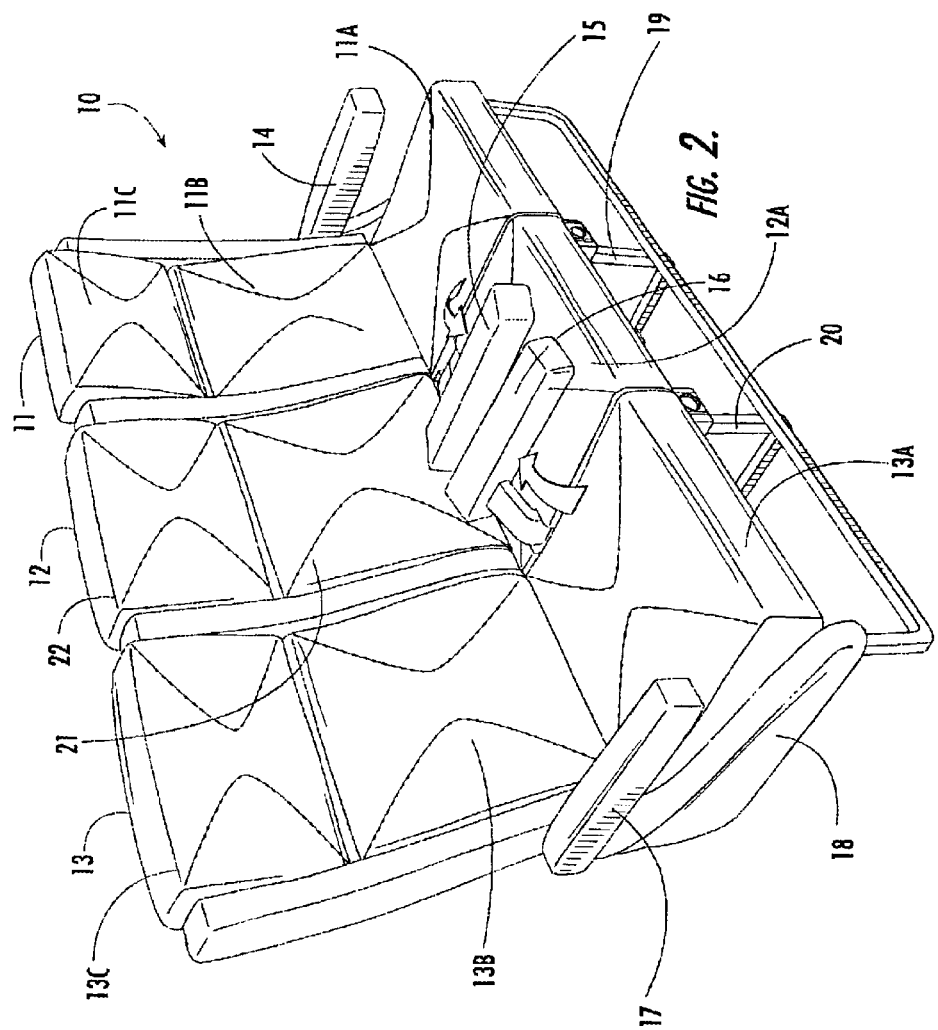
FIG. 2 is a perspective view of the seat assembly in FIG. 1 during conversion to a two-seat business configuration.
Figure 3:
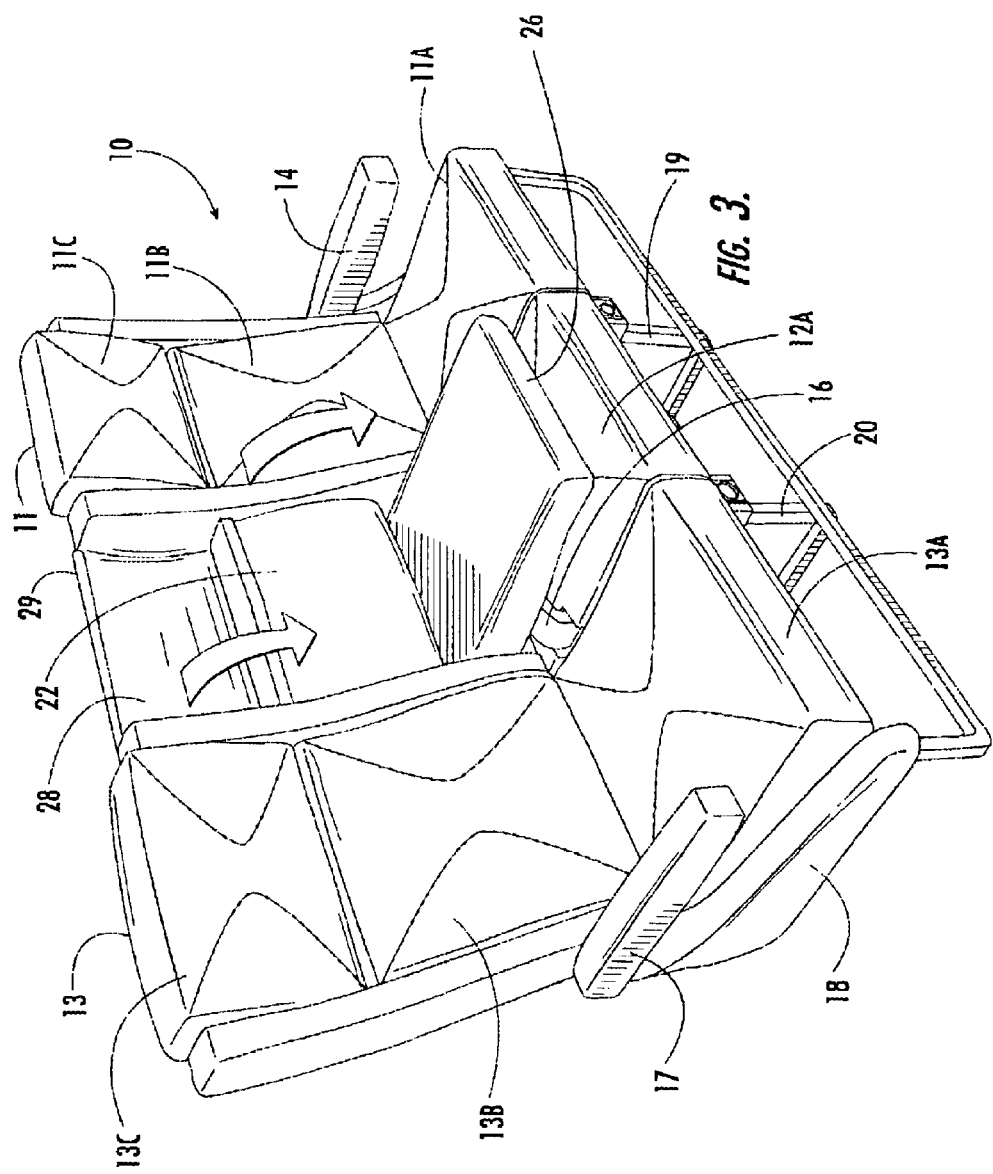
FIG. 3 is a perspective view of the seat assembly in FIG. 1 in the two-seat business configuration.
Figure 4:
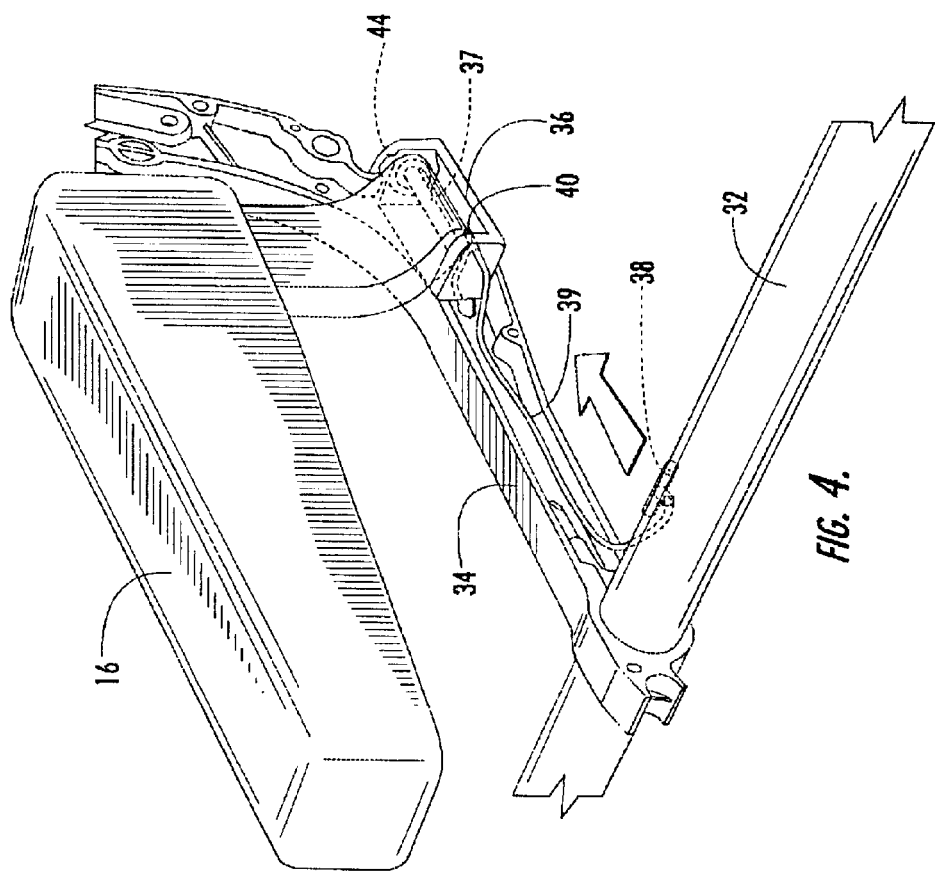
FIG. 4 is an enlarged fragmentary perspective view of an armrest in the raised use position and the latching mechanism for moving an armrest between the raised and lowered positions.
Figure 5:
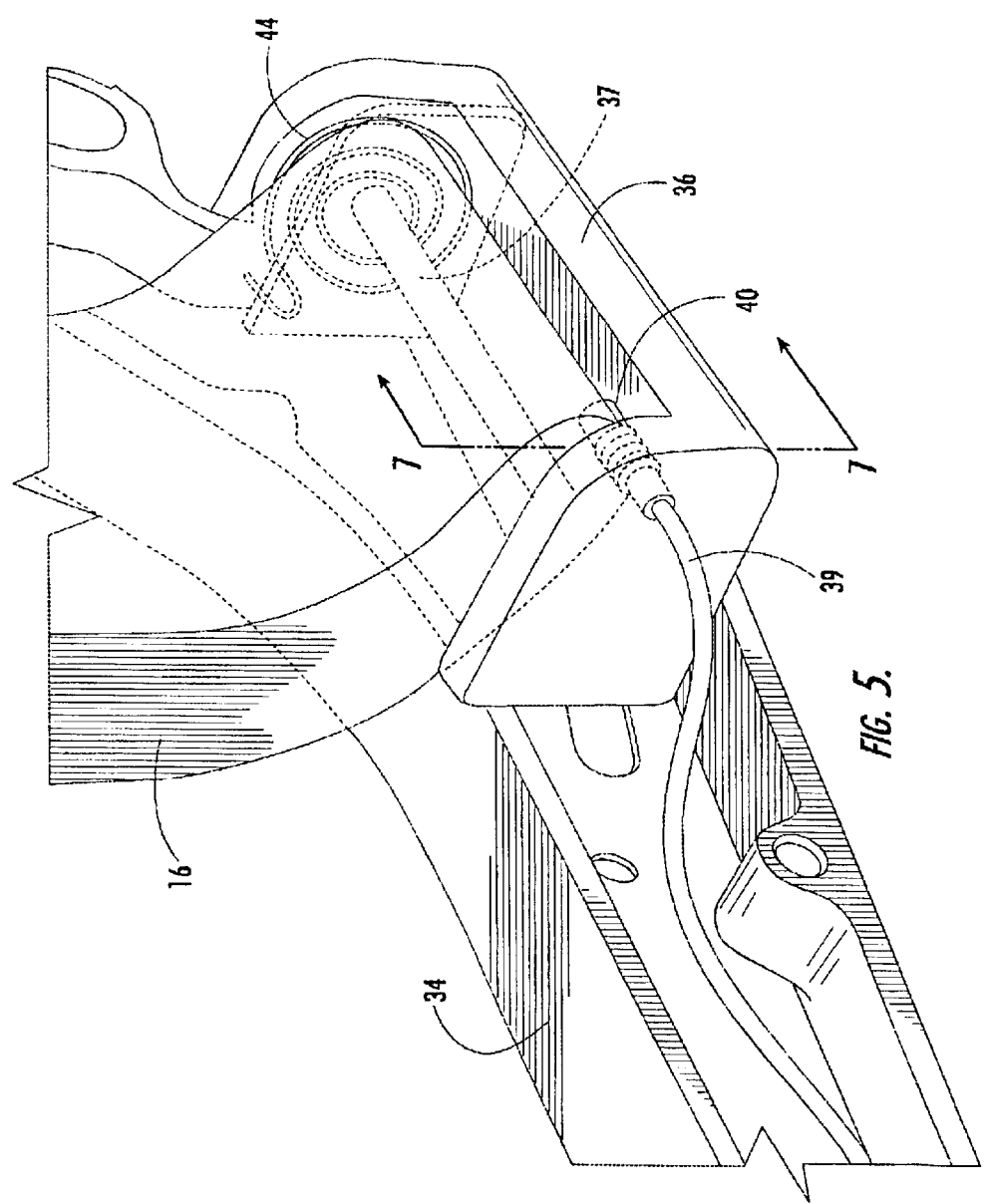
FIG. 5 is a further enlarged fragmentary perspective view of the armrest shown in FIG. 4.

Referring now to FIGS. 1, 2 and 3, the manner of conversion of the seat assembly 10 between the three-seat coach class configuration and a business class configuration is shown. This conversion would ordinarily be accomplished during ground servicing, and would be based on the passenger mix anticipated for the upcoming flight based on reservations for particular seating classes. If a particular flight needs more business class seats, the armrests 15 and 16 are lowered from an upright use position to a lowered storage position with the inboard sides of the armrests 15 and 16 resting on the seat bottom cushion 12A of the center seat 12. Then, the seat back cushion 21 is pulled forward from the top and is pivoted downwardly into a position wherein the forward surface of the seat back cushion 21 rests on the upper sides of the armrests 15 and 16, as is shown in FIG. 3. The rearward side of the seat back cushion 21 has attached thereto a tray table 26 which, when lowered as shown, provides both an armrest and a hard, stable surface for personal items as well as food and beverage containers. Just as importantly, the tray table 26 provides a buffer area creating a privacy zone between the occupants of seats 11 and 13—an important perceptual consideration in pricing business class seating.

As is also shown in FIG. 3, the head rest 22 of seat 12 can be optionally pivoted downwardly to cover and enclose the area vacated by the seat back cushion 21 and tray table 26. This provides a cushion support for the inside elbow of the occupant as well as providing a more aesthetically-pleasing and finished appearance to the resulting business class seating arrangement. The upper end 28 of the seat back shell 29 is also trimmed and finished to provide an aesthetically-pleasing appearance.

Referring now to FIGS. 4–8, the armrest 16, also exemplary of armrest 15, is shown and described in further detail. As is conventional, the seat assembly 10 is carried by a plurality of laterally-extending beam elements. A forward beam element 32 connects together a series of ladder frame elements, such as ladder frame element 34. The ladder frame element 34 and similar ladder frame elements spaced laterally along the length of the seat assembly 10 carry the seating elements, such as the seat bottom and seat back pan, recline mechanisms, electronics and other seating elements. Armrest 16 is mounted in a pivot housing 36 on a pivot pin 37. A T-bracket release handle 38 is connected by a cable 39 to a latching pin 40 which extends through a hole 41 in the armrest 16. All of the mechanism is contained in the pivot housing 36 in the side of the seat 12 and under the seat bottom cushion 12A so as to be undetectable by the seat occupant.

The T-bracket release handle 38 is also positioned on the aft side of the beam element 32 to be completely hidden from the seat occupant. When the release handle 38 is pulled by a ground crew, FIG. 6, a torsion spring 44 causes the armrest 16 to automatically rotate into the center of the seat bottom of seat 12. When the armrest 16 has rotated beyond 70 degrees, a nose portion 45 of the armrest 16, see FIGS. 7 and 8, contacts a arm cam stop 47, and the armrest 16 comes to a positive stop against the seat bottom cushion 12A. The armrest is held down by the torsion spring 44. To return the armrest 16 to the upright use position, the armrest 16 is lifted up out of the storage position. The latching pin 40 snaps back into the latch hole 41 and locks the armrest 16 in the upright use position.

Armrest 15 operates in the same manner, and by lowering both armrests 15 and 16 in the manner described above, a support is provided for the tray table 26. As is shown in FIG. 3, by lowering both armrests 15, 16 and the tray table 26, significant additional seating width is provided to both outboard seat occupants. A flexible cover flap, not shown, may be provided to cover the portion of the armrest adjacent the pivot housing 36.

The tray table 26 and the head rest 22 are pivoted to the ladder frame elements in a conventional manner.

A convertible passenger seat assembly and method are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A passenger seat assembly convertible between a two-seat configuration and a three-seat configuration, comprising:
   (a) a seat assembly base;
   (b) first, second and third seats for carrying respective seat bottom and seat back cushions, said first and third seats defining outboard seats and said second seat defining a center seat;
   (c) first and second armrests mounted between the first and third outboard seats on opposing sides of the center seat and moveable between an upright use position and a retracted storage position above the seat bottom of the center seat;
   (d) a headrest carried by the center seat; and
   (e) a tray table mounted for movement independent of movement of the headrest between a raised retracted position wherein a bottom surface of the tray table defines a lower portion of the seat back of the center seat, and a lowered use position wherein the tray table resides above the seat bottom of the center seat to provide additional seating space and tray table for the occupants of the outboard seats; and
   (f) wherein said headrest is moveable between a headrest use position in lateral alignment with headrest portions of the backrests of the outboard seats and a lowered tray table use position below the level of the headrest portions of the backrests of the outboard seats and aft of the tray table.

2. A passenger seat assembly according to claim 1, wherein the headrest is moveable between a headrest use position in lateral alignment with headrest portions of the backrests of the outboard seats and a lowered tray table use position aft of the tray table.

3. A passenger seat assembly according to claim 1, wherein the headrest is pivotable between a raised headrest use position in lateral alignment with headrest portions of the backrests of the outboard seats and a lowered tray table use position aft of the tray table.

4. A passenger seat assembly according to claim 1, wherein said tray table is pivotally mounted for movement between the raised retracted position and the lowered use position.

5. A passenger seat assembly according to claim 1, wherein the tray table comprises a single tray table surface sufficiently wide to be useable by occupants of both outboard seats as an inboard arm support and as a table for personal, food and beverage items.

6. A passenger seat assembly convertible between a two-seat configuration and a three-seat configuration, comprising:
   (a) a seat assembly base;
   (b) first, second and third seats for carrying respective seat bottom and seat back cushions, said first a third seats defining outboard seats and said second seat defining a center seat;
   (c) first and second armrests pivotably mounted between the first and third outboard seats on opposing sides of the center seat and moveable between an upright use position and a retracted storage position above the seat bottom of the center seat; and
   (d) a tray table mounted for movement between a raised retracted position wherein a bottom surface of the tray table defines a lower portion of the seat back of the center seat, and a lowered use position between the first and third outboard seats; and (e) the seat back of the center seat including a headrest pivotable between a headrest use position in lateral alignment with headrest portions of the backrests of the outboard seats and a lowered tray table use position below the level of the headrest portions of the backrests of the outboard seats and aft of the tray table independent of movement of the tray table.

7. A passenger seat assembly convertible between a coach class configuration with an armrest between each of a plurality of inboard seats, and a business class configuration, comprising:

(a) a seat assembly base;

(b) at least first, second and third seats for carrying respective seat bottom and seat back cushions, two of the seats defining outboard seats and each remaining seat defining a respective inboard seat;

(c) armrests mounted on respective inboard sides of the outboard seats and on respective opposing sides of each inboard seat and moveable between an upright use position and a retracted storage position above the seat bottom of the inboard seat to which a respective armrest is adjacent;

(d) a headrest carried by the center seat; and (e) a tray table carried by at least one inboard seat and mounted for movement independent of movement of the headrest between a retracted position wherein a bottom surface of the tray table defines a lower portion of the seat back of a respective inboard seat, and a use position between adjacent inboard or outboard seats, and (f) wherein said headrest is moveable between a headrest use position in lateral alignment with headrest portions of the backrests of the outboard seats and a lowered tray table use position below the level of the headrest portions of the backrests of the outboard seats and aft of the tray table.

8. A method of converting a passenger seat assembly convertible between a coach class configuration with an armrest between each of a plurality of inboard seats, and a business class configuration, comprising the steps of:

(a) providing:
  (i) a seat assembly base;
  (ii) at least first, second and third seats for carrying respective seat and seat back cushions, two of the seats defining outboard seats and each remaining seat defining a respective inboard seat;
  (iii) armrests mounted on respective inboard sides of the outboard seats and on respective opposing sides of each inboard seat and moveable between an upright use position and a retracted storage position above the seat bottom of the inboard seat to which a respective armrest is adjacent; and
  (iv) a headrest carried by said center seat, said headrest moveable between a headrest use position in lateral alignment with headrest portions of the backrests of the outboard seats and a lowered tray table use position below the level of the headrest portions of the backrests of the outboard seats and aft of the tray table;
  (v) a tray table carried by at least one inboard seat and mounted for movement independent of movement of the headrest between a retracted position wherein a bottom surface of the tray table defines a lower portion of the seat back of a respective inboard seat, and a use position between adjacent inboard or outboard seats:

(b) when the seat assembly is desired to be in the coach class configuration:
  (i) moving the armrests to the upright use position
  (ii) raising the headrest into the headrest use position;
  (iii) raising the tray table into the position defining a lower portion of the seat back of the center seat; and (c) when the seat assembly is desired to be in the business class configuration:
  (i) moving the armrests to the retracted storage position; and
  (ii) lowering the tray table into the use position above the seat bottom of the center seat; and
  (iii) lowering the headrest to a tray table use position aft of the tray table.

* * * * *

UNITED STATES PATENT AND TRADEMARK OFFICE
CERTIFICATE OF CORRECTION

PATENT NO. : 6,793,282 B2
DATED : September 21, 2004
INVENTOR(S) : Plant et al.

It is certified that error appears in the above-identified patent and that said Letters Patent is hereby corrected as shown below:

Column 6,
Line 15, delete "and"
Line 55, delete "first a third" and insert -- first and third --

Column 7,
Line 25, delete "and"

Column 8,
Line 36, delete "and"

Signed and Sealed this

Fourteenth Day of December, 2004

JON W. DUDAS
*Director of the United States Patent and Trademark Office*